(12) United States Patent
Song et al.

(10) Patent No.: US 12,074,299 B2
(45) Date of Patent: Aug. 27, 2024

(54) ASIC CHIP FOR PERFORMING ACTIVE BATTERY EQUALIZATION

(71) Applicants: Shanghai Makesens Energy Storage Technology Co., Ltd., Shanghai (CN); Shanghai Volta Institute of Digital Battery Energy Storage, Shanghai (CN)

(72) Inventors: Pei Song, Shanghai (CN); Guopeng Zhou, Shanghai (CN); Jian Zhao, Shanghai (CN); Zonglin Cai, Shanghai (CN); Xiao Yan, Shanghai (CN); Enhai Zhao, Shanghai (CN); Yan Ma, Shanghai (CN); Yunkai Wu, Shanghai (CN)

(73) Assignees: SHANGHAI MAKESENS ENERGY STORAGE TECHNOLOGY CO, LTD., Shanghai (CN); SHANGHAI VOLTA INSTITUTE OF DIGITAL BATTERY ENERGY STORAGE, Shanghai (CN)

( * ) Notice: Subject to any disclaimer, the term of this patent is extended or adjusted under 35 U.S.C. 154(b) by 0 days.

(21) Appl. No.: 18/482,864

(22) Filed: Oct. 7, 2023

(65) Prior Publication Data

US 2024/0178466 A1 May 30, 2024

(30) Foreign Application Priority Data

Nov. 29, 2022 (CN) .......................... 202211513895.X

(51) Int. Cl.
*H02J 7/00* (2006.01)
*H01M 10/42* (2006.01)
(Continued)

(52) U.S. Cl.
CPC ..... *H01M 10/4257* (2013.01); *H01M 10/441* (2013.01); *H01M 10/443* (2013.01);
(Continued)

(58) Field of Classification Search
CPC ........... H01M 10/4257; H01M 10/441; H01M 10/443; H01M 2010/4271; H02J 7/0019; H02M 3/1582
(Continued)

(56) References Cited

U.S. PATENT DOCUMENTS

2006/0071643 A1* 4/2006 Carrier .............. H01M 10/4257
320/132
2014/0042972 A1* 2/2014 Kim ...................... H02J 7/0016
320/118

FOREIGN PATENT DOCUMENTS

CN 201174408 Y 12/2008
CN 103019234 A 4/2013
(Continued)

OTHER PUBLICATIONS

Chinese Office Action Corresponding to Application No. 202211513895. X, mailed Apr. 26, 2023.

*Primary Examiner* — Zixuan Zhou
(74) *Attorney, Agent, or Firm* — Yue (Robert) Xu; Apex Attorneys at Law, LLP

(57) ABSTRACT

An ASIC chip for performing active battery equalization is provided. The ASIC chip for performing active battery equalization includes: a power conversion module, an equalization switch matrix circuit module comprising a power MOS transistor, a switch control module, a temperature protection module, and a communication interface module. By connecting and controlling the above modules, the equalization switch matrix circuit module performs equalization on a battery in the battery pack. That is, the use of the integrated ASIC chip accelerates and facilitates the BMS (Continued)

solution manufacturers adding the active equalization function, and facilitates the BMS Battery management system effectively improving the service performance and life of lithium batteries.

8 Claims, 4 Drawing Sheets

(51) Int. Cl.
  *H01M 10/44* (2006.01)
  *H02M 3/158* (2006.01)
(52) U.S. Cl.
  CPC ......... *H02J 7/0019* (2013.01); *H02M 3/1582* (2013.01); *H01M 2010/4271* (2013.01)
(58) Field of Classification Search
  USPC .................................................. 320/116–119
  See application file for complete search history.

(56) References Cited

FOREIGN PATENT DOCUMENTS

| | | | |
|---|---|---|---|
| CN | 206673610 | Y | 11/2017 |
| CN | 210669592 | A | 6/2020 |
| CN | 115275392 | Y | 11/2022 |
| WO | 2020186496 | A | 9/2020 |

* cited by examiner

ASIC CHIP FOR PERFORMING ACTIVE BATTERY EQUALIZATION

CROSS-REFERENCE TO RELATED APPLICATION

This application claims priority to Chinese Patent Application No. 202211513895.X, filed on Nov. 29, 2022, which is incorporated herein by its reference in its entirety.

TECHNICAL FIELD

The present disclosure relates to the field of energy storage, specifically to an ASIC chip for performing active battery equalization, and in particular to an ASIC chip for performing active battery equalization on a high-current lithium battery.

BACKGROUND

At present, lithium batteries with large capacities are widely used in energy storage power stations. In order to ensure the voltage consistency of the lithium batteries, voltage balancing circuits are adopted. The conventional battery management chips all have the function of passive equalization. For the passive equalization, the circuit is simple and reliable, and the cost is low. However, the efficiency of the passive equalization is low, and especially for large-capacity energy storage batteries, the effect of the passive equalization function is not obvious. For active equalization, excess energy is transferred to a high-capacity cell in charging a battery and excess energy is transferred to a low-capacity cell in discharging battery, thereby improving the usage efficiency. However, the conventional mainstream solutions, especially the transformer solutions, have complex structures.

In a case of adopting an independent MOS switching solution, MOS transistors with large packaging and small internal resistances are used to ensure a large equalization current, increasing costs and bringing problems to integration. In addition, how to design a switch matrix and how to perform safe control on a driver are problems required to be solved in integration. Therefore, most of the conventional battery management systems (BMSs) in China adopt passive equalization.

SUMMARY

In view of this, in order to solve the above problems, an ASIC chip for performing active battery equalization is provided according to the present disclosure. The following technical solutions are provided.

An ASIC chip for performing active battery equalization is provided. The ASIC chip for performing active battery equalization includes: a power conversion module, an equalization switch matrix circuit module including a power MOS transistor, a switch control module, a temperature protection module, and a communication interface module.

A first terminal of the equalization switch matrix circuit module is connected to an input terminal of a battery pack, a second terminal of the equalization switch matrix circuit module is connected to an active equalization power supply, a third terminal of the equalization switch matrix circuit module is connected to the temperature protection module, and a fourth terminal of the equalization switch matrix circuit module is connected to the switch control module.

The battery pack includes n batteries connected in series, where n>1 and n is a positive integer.

A positive pole of an n-th battery in the battery pack is connected to an input terminal of the power conversion module, a high-voltage output terminal of the power conversion module is connected to the equalization switch matrix circuit module and the switch control module, and a low-voltage output terminal of the power conversion module is connected to the temperature protection module and the communication interface module.

The equalization switch matrix circuit module is configured to perform equalization on a battery in the battery pack. The switch control module is configured to control a switching state of the power MOS transistor in the equalization switch matrix circuit module. The temperature protection module is configured to perform temperature protection on the power MOS transistor in the equalization switch matrix circuit module. The communication interface module is configured to perform communication with an external system.

In an embodiment, in the ASIC chip for performing active battery equalization, the power conversion module includes a boost circuit unit and a buck circuit unit. An input terminal of the boost circuit unit is connected to an input terminal of the buck circuit unit, and serves as the input terminal of the power conversion module. An output terminal of the boost circuit unit serves as the high-voltage output terminal of the power conversion module. An output terminal of the buck circuit unit serves as the low-voltage output terminal of the power conversion module.

In an embodiment, in the ASIC chip for performing active battery equalization, a negative electrode of a first battery serves as an internal grounding terminal of the ASIC chip for performing active battery equalization.

In an embodiment, in the ASIC chip for performing active battery equalization, the equalization switch matrix circuit module includes: a first main circuit, a second main circuit, n+1 branch circuits, and a current source. For each of the batteries in the battery pack, a positive pole of the battery is connected to a first terminal of a branch circuit, and a negative pole of a first battery is connected to a first terminal of a branch circuit. A power MOS transistor is connected in series in the first main circuit, a power MOS transistor is connected in series in the second main circuit, and two power MOS transistors are connected in series in each of the branch circuits. A first terminal of the first main circuit is connected to a first terminal of the current source and a first terminal of the active equalization power supply. A first terminal of the second main circuit is connected to a second terminal of the current source and a second terminal of the active equalization power supply. All second terminals of branch circuits corresponding to odd number-th batteries are connected to a second terminal of the first main circuit. A second terminal of the branch circuit corresponding to the negative pole of the first battery and second terminals of branch circuits corresponding to even number-th batteries are connected to a second terminal of the second main circuit.

In an embodiment, in the ASIC chip for performing active battery equalization, the power MOS transistor in the equalization switch matrix circuit module is an N-type power MOS transistor.

In an embodiment, in the ASIC chip for performing active battery equalization, the switch control module includes: a signal output unit, a signal interface unit, and multiple control units. An output terminal of the signal output unit is connected to an input terminal of the signal interface unit, an output terminal of the signal interface unit is connected to an input terminal of the control units, an output terminal of a control unit corresponds to an output terminal of the signal interface unit, and an output terminal of the control unit is connected to a gate of the power MOS transistor in the equalization switch matrix circuit module. A first input terminal of the signal output unit is connected to the communication interface module, and a second input terminal of the signal output unit is connected to the temperature protection module. The signal output unit is configured to output a first control signal for controlling operation states of the control units, and the control units are configured to output a second control signal for controlling an operation state of the power MOS transistor in the equalization switch matrix circuit module based on the first control signal.

In an embodiment, in the ASIC chip for performing active battery equalization, the switch control module further includes a timer protection unit. A third input terminal of the signal output unit is connected to the timer protection unit. The timer protection unit is configured to control an operation state of the signal output unit based on a time instant at which performing equalization on the battery and/or a time period of the ASIC chip for performing active battery equalization from overheating to recovery.

In an embodiment, in the ASIC chip for performing active battery equalization, for each of the control units, the control unit includes: a first resistor, a second resistor, a diode, a first MOS transistor, and a second MOS transistor. A first terminal of the first resistor is connected to a gate of the first MOS transistor at a connection node, and the connection node is connected to the output terminal of the signal interface unit. A second terminal of the first resistor is connected to a first terminal of a first signal interface unit at a connection node, and the connection node is grounded. A second terminal of the first MOS transistor is connected to a first terminal of the second resistor, an anode of the diode and a gate of the second MOS transistor. A second terminal of the second resistor, a cathode of the diode and a first terminal of the second MOS transistor are connected to the high-voltage output terminal of the power conversion module. A second terminal of the second MOS transistor is connected to the gate of the power MOS transistor in the equalization switch matrix circuit module.

In an embodiment, in the ASIC chip for performing active battery equalization, the first MOS transistor is an N-type power MOS transistor, and the second MOS transistor is a P-type power MOS transistor.

In an embodiment, in the ASIC chip for performing active battery equalization, the temperature protection module includes: an OR gate unit and multiple temperature protection units. Output terminals of the temperature protection units are connected to an input terminal of the OR gate unit, and an output terminal of the OR gate unit serves as an output terminal of the temperature protection module. For each of the temperature protection units, the temperature protection unit includes: a third resistor, a fourth resistor, a fifth resistor, a thermistor, and a comparator. A first terminal of the third resistor is connected to a first terminal of the fifth resistor at a connection node, and the connection node is connected to the low-voltage output terminal of the power conversion module. A second terminal of the third resistor is connected to a first terminal of the fourth resistor at a connection node, and the connection node is connected to a first input terminal of the comparator. A second terminal of the fifth resistor is connected to a first terminal of the thermistor at a connection node, and the connection node is connected to a second input terminal of the comparator. A second terminal of the fourth resistor and a second terminal of the thermistor are respectively grounded. An output terminal of the comparator serves as an output terminal of the temperature protection unit.

Compared to the conventional technology, the following beneficial effects can be achieved with the present disclosure.

The ASIC chip for performing active battery equalization according to the present disclosure includes: a power conversion module, an equalization switch matrix circuit module including a power MOS transistor, a switch control module, a temperature protection module, and a communication interface module. A first terminal of the equalization switch matrix circuit module is connected to an input terminal of a battery pack, a second terminal of the equalization switch matrix circuit module is connected to an active equalization power supply, a third terminal of the equalization switch matrix circuit module is connected to the temperature protection module, and a fourth terminal of the equalization switch matrix circuit module is connected to the switch control module. The battery pack includes n batteries connected in series, where n>1 and n is a positive integer. A positive pole of an n-th battery in the battery pack is connected to an input terminal of the power conversion module, a high-voltage output terminal of the power conversion module is connected to the equalization switch matrix circuit module and the switch control module, and a low-voltage output terminal of the power conversion module is connected to the temperature protection module and the communication interface module. The equalization switch matrix circuit module is configured to perform equalization on a battery in the battery pack. The switch control module is configured to control a switching state of the power MOS transistor in the equalization switch matrix circuit module. The temperature protection module is configured to perform temperature protection on the power MOS transistor in the equalization switch matrix circuit module. The communication interface module is configured to perform communication with an external system. The ASIC chip for performing active battery equalization includes the power conversion module, the equalization switch matrix circuit module including the power MOS transistor, the switch control module, the temperature protection module, and the communication interface module. By connecting and controlling the above modules, the equalization switch matrix circuit module performs equalization on a battery in the battery pack. That is, the use of the integrated ASIC chip accelerates and facilitates the BMS solution manufacturers adding the active equalization function, and facilitates the BMS Battery management system effectively improving the service performance and life of lithium batteries.

BRIEF DESCRIPTION OF THE DRAWINGS

In order to more clearly illustrate the technical solutions of embodiments of the present disclosure or in the conventional technology, drawings to be used in the description of the embodiments of the present disclosure or the conventional technology are briefly described hereinafter. It is apparent that the drawings in the following description show only some embodiments of the present disclosure. Those skilled in the art can obtain other drawings based on these drawings without any creative efforts.

DETAILED DESCRIPTION OF THE EMBODIMENTS

Technical solutions in the embodiments of the present disclosure are clearly and completely described hereinafter in conjunction with the drawings in the embodiments of the present disclosure. Apparently, the described embodiments are only part embodiments of the present disclosure, rather than all embodiments. Other embodiments obtained by those skilled in the art without any creative efforts based on the embodiments of the present disclosure fall within the protection scope of the present disclosure.

Based on the contents in the background part, in order to solve the technical problems in the conventional technology and make the active equalization function easy to be integrated in a BMS Battery management system, a method for designing a high-current ASIC (Application Specific Integrated Circuit) chip for performing active battery equalization is provided according to the embodiments of the present disclosure. With the integrated ASIC chip, the technical problems in the conventional technology are solved, accelerating and facilitating the BMS solution manufacturers adding the active equalization function, and facilitating the BMS Battery management system effectively improving the service performance and life of lithium batteries.

In order to make the above objectives, features, and advantages of the present disclosure more apparent and understandable, detailed descriptions of the present disclosure are provided below in conjunction with the accompanying drawings and specific embodiments.

Figure 1:
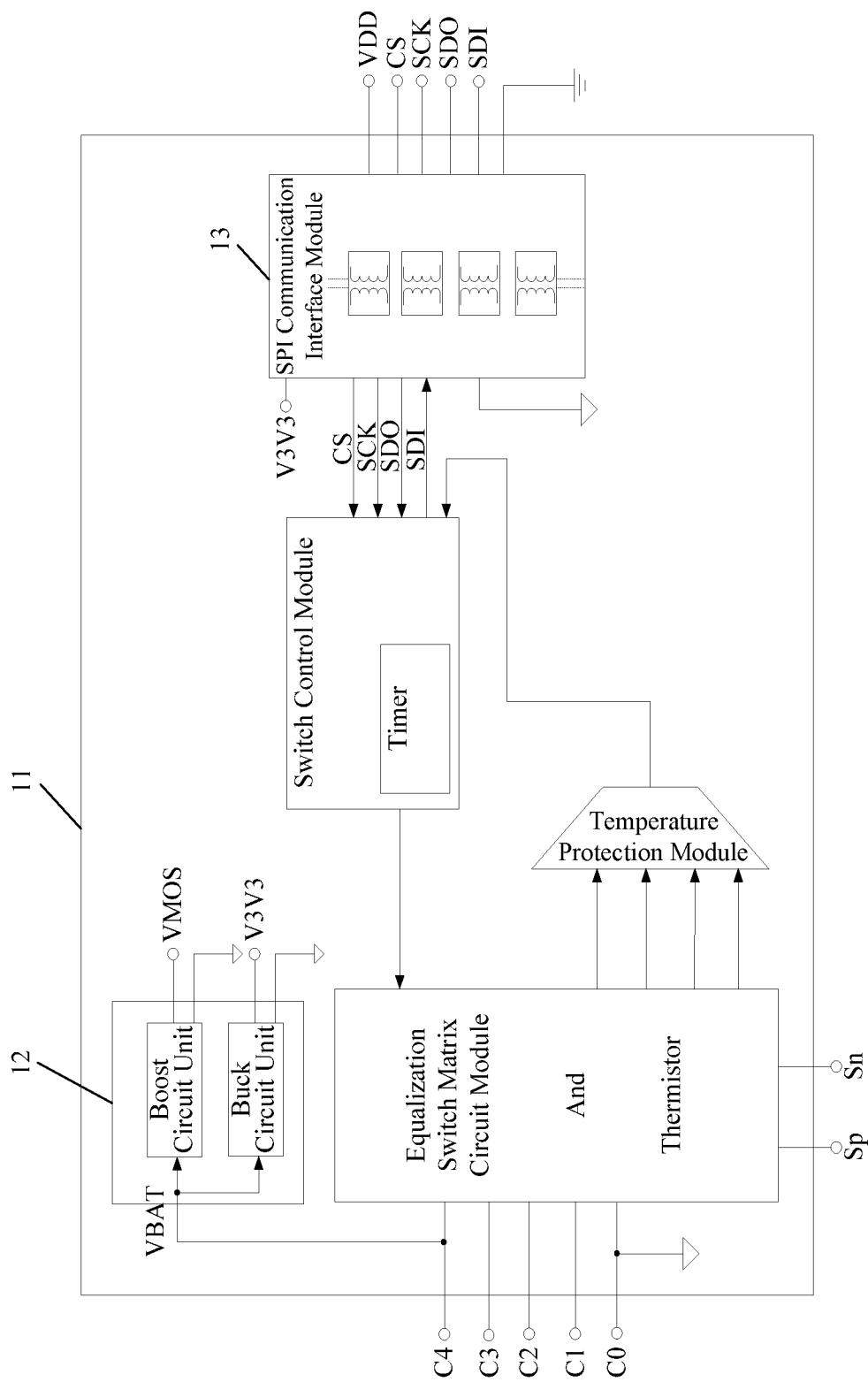
FIG. 1 is a schematic structural diagram of an ASIC chip for performing active battery equalization according to an embodiment of the present disclosure.

Reference is made to FIG. 1, which is a schematic structural diagram of an ASIC chip for performing active battery equalization according to an embodiment of the present disclosure. The ASIC chip 11 for performing active battery equalization includes: a power conversion module 12, an equalization switch matrix circuit module (that is, the Blance Power Mos Matrix shown in FIG. 1) including a power MOS transistor, a switch control module (that is, the Blance Switch Ctrl shown in FIG. 1), a temperature protection module (Temp Protect), and a communication interface module 13.

A first terminal of the equalization switch matrix circuit module is connected to an input terminal of a battery pack, a second terminal of the equalization switch matrix circuit module is connected to an active equalization power supply, a third terminal of the equalization switch matrix circuit module is connected to the temperature protection module, and a fourth terminal of the equalization switch matrix circuit module is connected to the switch control module. The battery pack includes n batteries connected in series, where n>1 and n is a positive integer.

A positive pole of an n-th battery in the battery pack is connected to an input terminal of the power conversion module. A high-voltage output terminal of the power conversion module is connected to the equalization switch matrix circuit module and the switch control module, and a low-voltage output terminal of the power conversion module is connected to the temperature protection module and the communication interface module.

The equalization switch matrix circuit module is configured to perform equalization on a battery in the battery pack. The switch control module is configured to control a switching state of the power MOS transistor in the equalization switch matrix circuit module. The temperature protection module is configured to perform temperature protection on the power MOS transistor in the equalization switch matrix circuit module. The communication interface module is configured to perform communication with an external system.

It should be noted that in an embodiment of the present disclosure, a battery pack including four batteries connected in series is taken as an example. In FIG. 1, C0, C1, C2, C3, and C4 represent inputs of the battery pack. C4 represents a positive pole of a battery in the battery pack, C3, C2 and C1 represent positive poles of batteries in the battery pack, and C0 represents a negative pole of a battery in the battery pack.

Specifically, the ASIC chip for performing active battery equalization in the embodiment of the present disclosure includes the following six function modules: a power conversion module, an equalization switch matrix circuit module including a power MOS transistor, a switch control module, a temperature protection module, and a communication interface module. By connecting and controlling the above modules, the equalization switch matrix circuit module performs equalization on a battery in the battery pack. That is, the use of the integrated ASIC chip accelerates and facilitates the BMS solution manufacturers adding the active equalization function, and facilitates the BMS Battery management system effectively improving the service performance and life of lithium batteries.

The power conversion module is a DC-DC power conversion module. The power conversion module includes: a boost circuit unit (that is, the boost shown in FIG. 1) and a buck circuit unit (that is, the buck shown in FIG. 1). An input terminal of the boost circuit unit is connected to an input terminal of the buck circuit unit, and serves as the input terminal of the power conversion module. An output terminal of the boost circuit unit serves as the high-voltage output terminal VMOS of the power conversion module. An output terminal of the buck circuit unit serves as the low-voltage output terminal V3V3 of the power conversion module.

That is, in an embodiment of the present disclosure, a voltage VBAT is introduced through a positive pole of a battery in the battery pack as an input of the power conversion module in the ASIC chip for performing active battery equalization. After being boosted by the boost circuit unit, VMOS is outputted, which serves as a driving power supply for the power MOS transistor. In an embodiment, VMOS is equal to VBAT+10V with an error of ±1V, and a maximum instantaneous output current may be 500 mA. With the boost circuit unit, a sufficiently high driving level is generated to rapidly turn on the power MOS transistor, and an internal resistance of an equalization channel, corresponding to the battery, in the equalization switch matrix circuit module is maintained at a small value after the power MOS transistor is turned on, thereby avoiding self-heating of the power MOS transistor when being turned on. After being bucked by the buck circuit unit, V3V3 is outputted, which serves as a low-voltage power supply and a signal driving power supply for a digital part and an analog part of the ASIC chip for performing active battery equalization. In an embodiment, V3V3 is about 3.3V±0.5V, and a maximum output current may be 30 mA.

The equalization switch matrix circuit module including a power MOS transistor performs equalization on a battery in the battery pack by turning on and turning off the power MOS transistor.

Figure 2:
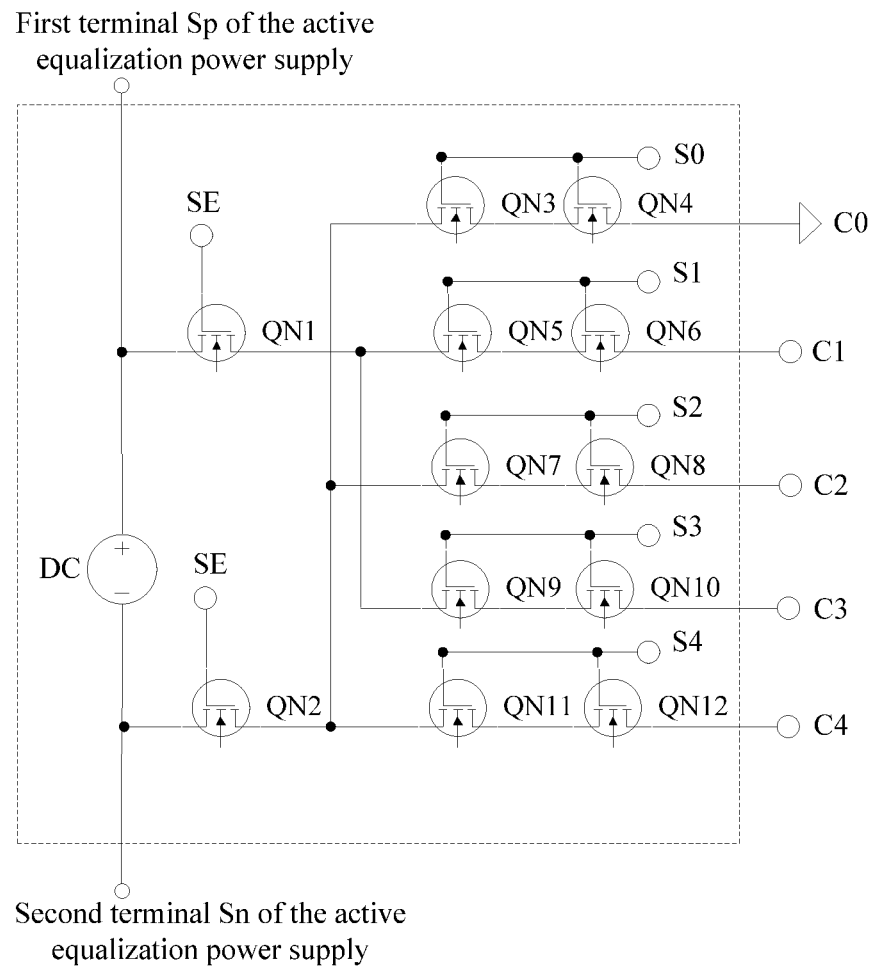
FIG. 2 is a schematic structural diagram of a circuit of an equalization switch matrix circuit module including a power MOS transistor according to an embodiment of the present disclosure.

In another embodiment of the present disclosure, reference is made to FIG. 2, which is a schematic structural diagram of a circuit of an equalization switch matrix circuit module including a power MOS transistor according to an embodiment of the present disclosure.

The equalization switch matrix circuit module includes: a first main circuit, a second main circuit, n+1 branch circuits, and a current source DC. For each of the batteries in the battery pack, a positive pole of the battery is connected to a first terminal of a branch circuit, and a negative pole of a first battery is connected to a first terminal of a branch circuit.

A power MOS transistor is connected in series in the first main circuit, a power MOS transistor is connected in series in the second main circuit, and two power MOS transistors are connected in series in each of the branch circuits. QN1, QN2, QN3, QN4, QN5, QN6, QN7, QN8, QN9, QN10, QN11, and QN12 shown in FIG. 2 represent the power MOS transistors.

A first terminal of the first main circuit is connected to a first terminal of the current source and a first terminal Sp of the active equalization power supply.

A first terminal of the second main circuit is connected to a second terminal of the current source and a second terminal Sn of the active equalization power supply.

All second terminals of branch circuits corresponding to odd number-th batteries are connected to a second terminal of the first main circuit.

A second terminal of the branch circuit corresponding to the negative pole of the first battery and second terminals of branch circuits corresponding to even number-th batteries are connected to a second terminal of the second main circuit.

Specifically, in an embodiment of the present disclosure, the equalization switch matrix circuit module including the power MOS transistors is configured to control a battery in the battery pack to conduct with the active equalization power supply, and perform equalization processing on the battery. In principle, to perform equalization of a battery, it is only required to connect an active equalization power supply to a positive pole and a negative pole of the battery. Therefore, in an embodiment of the present disclosure, in designing a channel switch of the equalization switch matrix circuit module including the power MOS transistors, a pair of power MOS transistors is arranged on a positive pole of the battery channel and a negative pole of a battery, that is, a transistor pair design is adopted. In addition, the batteries connected in series in the battery pack are grouped into odd number-th batteries and even number-th batteries. All the second terminals of the branch circuits corresponding to the odd number-th batteries are connected to the second terminal of the first main circuit, and the second terminal of the branch circuit corresponding to the negative pole of the first battery and the second terminals of the branch circuits corresponding to the even number-th batteries are connected to the second terminal of the second main circuit. Then, the connection to the active equalization power supply is performed through two main circuits.

For example, in a case of performing equalization on the first battery in the battery pack, it is required to turn on four power MOS transistors on channels corresponding to C0 and C1 and turn on two power MOS transistors on two main circuits. That is, QN1, QN2, QN3, QN4, QN5 and QN6 are turned on simultaneously.

After equalization switches are turned on, Sn and Sp that are led out outward serve as input terminals for an active equalization power supply. An external power supply with a custom equalization current is connected, as long as the current does not exceed maximum allowable passing currents of the power MOS transistors.

That is, in the embodiments of the present disclosure, a transistor pair design is adopted to form the equalization switch matrix circuit module, ensuring that no leakage current is generated as long as the power MOS transistors are not turned on. In addition, odd channel switches and even channel switches are added, thereby effectively enhancing the stability of the equalization switch matrix circuit module.

In another embodiment of the present disclosure, the power MOS transistors in the equalization switch matrix circuit module are N-type power MOS transistors.

Specifically, in the embodiments of the present disclosure, the power MOS transistors represented by QN1, QN2, QN3, QN4, QN5, QN6, QN7, QN8, QN9, QN10, QN11 and QN12 are all N-type power MOS transistors, which may be easy to be integrated in a case of a large current flowing.

S0, S1, S2, S3, S4, and SE represent control signals of the power MOS transistors, and the output is controlled by the switch control module.

Figure 3:
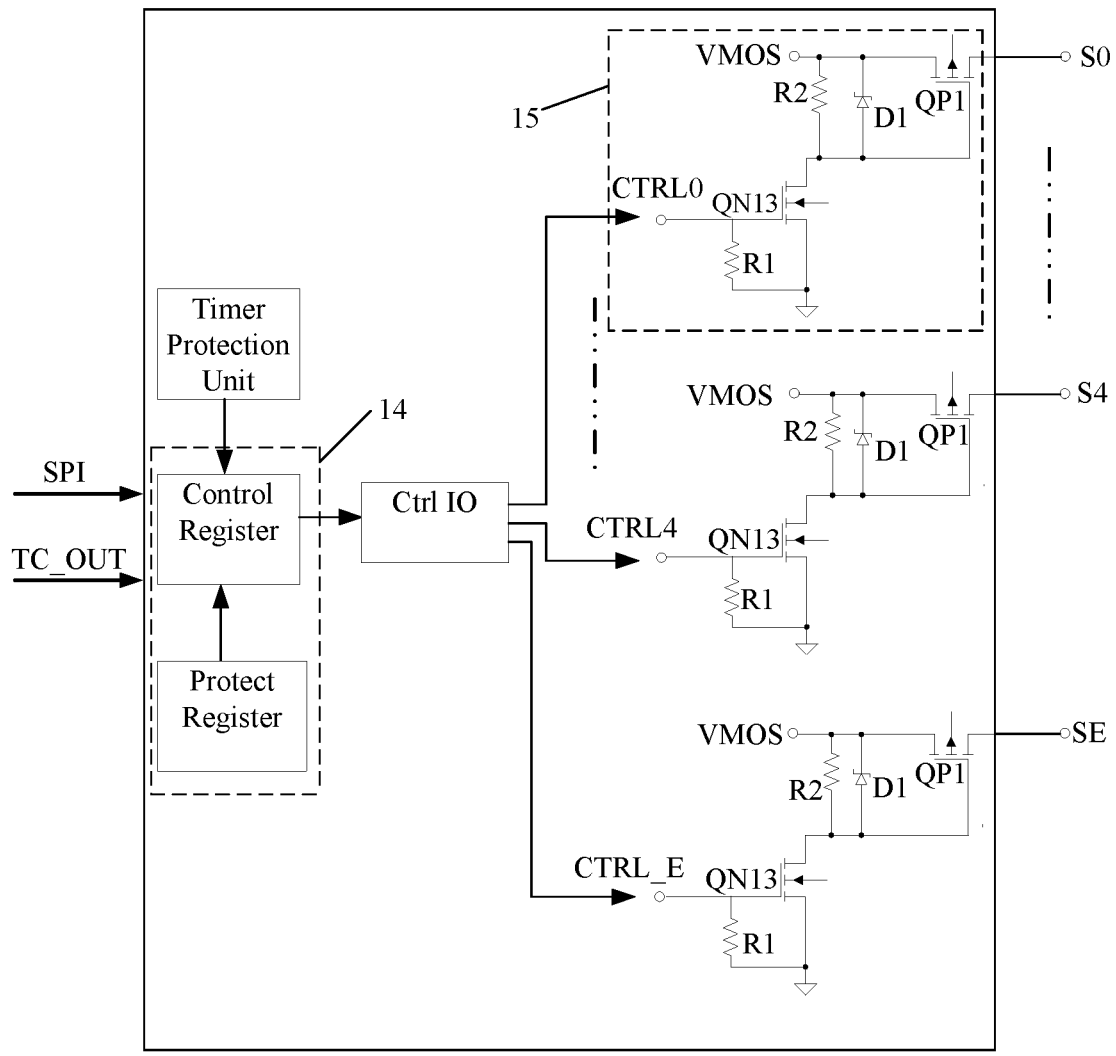
FIG. 3 is a schematic structural diagram of a circuit of a switch control module according to an embodiment of the present disclosure.

In another embodiment of the present disclosure, reference is made to FIG. 3, which is a schematic structural diagram of a circuit of a switch control module according to an embodiment of the present disclosure.

The switch control module includes: a signal output unit 14, a signal interface unit Ctrl IO, and multiple control units 15.

An output terminal of the signal output unit 14 is connected to an input terminal of the signal interface unit. An output terminal of the signal interface unit is connected to an input terminal of the control units. An output terminal of a control unit corresponds to an output terminal of the signal interface unit. An output terminal of the control unit is connected to a gate of the power MOS transistor in the equalization switch matrix circuit module.

A first input terminal of the signal output unit is connected to the communication interface module, and a second input terminal of the signal output unit is connected to the temperature protection module.

The signal output unit is configured to output a first control signal for controlling operation states of the control units. The control units are configured to output a second control signal for controlling an operation state of the power MOS transistor in the equalization switch matrix circuit module based on the first control signal.

The switch control module further includes a timer protection unit Timer.

A third input terminal of the signal output unit is connected to the timer protection unit.

The timer protection unit is configured to control an operation state of the signal output unit based on a time instant at which performing equalization on the battery and/or a time period of the ASIC chip for performing active battery equalization from overheating to recovery.

Each of the control unit includes: a first resistor R1, a second resistor R2, a diode D1, a first MOS transistor QN13, and a second MOS transistor QP1.

A first terminal of the first resistor is connected to a gate of the first MOS transistor at a connection node, and the connection node is connected to the output terminal of the signal interface unit.

A second terminal of the first resistor is connected to a first terminal of a first signal interface unit at a connection node, and the connection node is grounded.

A second terminal of the first MOS transistor is connected to a first terminal of the second resistor, an anode of the diode and a gate of the second MOS transistor.

A second terminal of the second resistor, a cathode of the diode and a first terminal of the second MOS transistor are all connected to the high-voltage output terminal of the power conversion module.

A second terminal of the second MOS transistor is connected to the gate of the power MOS transistor in the equalization switch matrix circuit module.

The first MOS transistor is an N-type power MOS transistor, and the second MOS transistor is a P-type power MOS transistor.

In an embodiment of the present disclosure, the signal output unit 14 includes a control register (that is, the Ctrl Register shown in FIG. 3) and a protection register (that is, the Protect Register shown in FIG. 3). The protection register is configured to modify a state value in the control register. Specifically, based on the design of the power conversion module, it can be seen that VMOS is the driving power supply for the power MOS transistors. Therefore, a pair of non-active NMOS (that is, the first MOS transistor) and PMOS (that is, the second power MOS) interlocking control circuits are designed in the control unit to control the VMOS to be outputted to the corresponding channel. Based on the CTRL signal, the control register controls the MOS transistors to be turned on or turned off by outputting a high level (corresponding to V3V3) or a low level (corresponding to the internal grounding terminal of the ASIC chip for performing active battery equalization) through the signal interface unit based on the state value in the control register. Each of battery channels corresponds to a CTRL signal (that is, CTRL1 to CTRL4), and the odd trunk channels and even trunk channels are controlled based on a CTRL_E signal.

The state value of the control register is initialized to 0 by default when powering on the control register, that is, all CTRL signals outputted by the signal interface unit are low levels by default.

It should be noted that in an embodiment of the present disclosure, the state value of the control register may be changed in the following three manners.

In a first manner, the state value of the control register is written and modified by performing communication with external through the communication interface module.

In a second manner, the temperature protection module outputs a signal TC_OUT, and the state value of the control register is actively written and modified when detecting a transition edge from a low level to a high level of TC_OUT in a switch control module controlling process.

In a third manner, protection parameters in the protection register are read in a switch control module controlling process, and the state value of the control register are actively written and modified when a built-in protection function is performed by a built-in timer protection unit based on the protection parameters.

In the embodiments of the present disclosure, the following two protection functions are performed.

A first protection function is an equalization channel timeout protection. That is, in a case that an opening time period of an equalization channel exceeds a time period set in the protection register, the timer protection unit transmits a signal to the control register to change the state of the control register, then the equalization channel is closed.

A second protection function is an over-temperature protection delay timing function. That is, after over-temperature protection is performed in ASIC chip for performing active battery equalization, a temperature protection state may be obtained in a case that the temperature returns to normal and a time period from protection to recovery is greater than or equal to a delay time period set in the protection register.

In an embodiment of the present disclosure, the communication interface module may be a magnetic isolation SPI communication interface module and performs communication with an external system, so that an external master MCU controls the ASIC chip for performing active battery equalization.

In an embodiment of the present disclosure, the magnetic isolation SPI communication interface module performs communication with an external system, so that the ASIC chip for performing active battery equalization is integrated in a system application. That is, an external main control system, such as an MCU, may transmit an instruction through the SPI communication interface module. The instruction, after internal magnetic isolation conversion, is transmitted to the switch control module. Then, the control register and the protection register in the switch control module are read and written, the equalization channels are controlled to be turned on or turned off, a temperature protection value is configured, and a maximum opening time period for the equalization channels is configured. In addition, a register value may be read to obtain a current state, such as an equalization channel open state and a temperature protection state, of the ASIC chip for performing active battery equalization.

With the magnetic isolation technology, analog and digital isolation is performed, realizing communication security and facilitating performing daisy chain serial communication.

In another embodiment of the present disclosure, a negative electrode of the first battery serves as an internal grounding terminal of the ASIC chip for performing active battery equalization.

In an embodiment of the present disclosure, a negative electrode of a battery in the battery pack serves as an internal grounding terminal of the ASIC chip for performing active battery equalization, that is, a grounding terminal of a digital and analog part in the ASIC chip for performing active battery equalization. The internal ground terminal of the ASIC chip for performing active battery equalization is only related to one battery in the current connected battery pack, and is not related to the ground of the battery pack. In this way, in a case that several ASIC chips for performing active battery equalization are connected in series with a battery pack that includes multiple batteries connected in series, stability of an internal switch system can be ensured without interference with each other, thereby improving the stability of each of the ASIC chips for performing active battery equalization.

Figure 4:
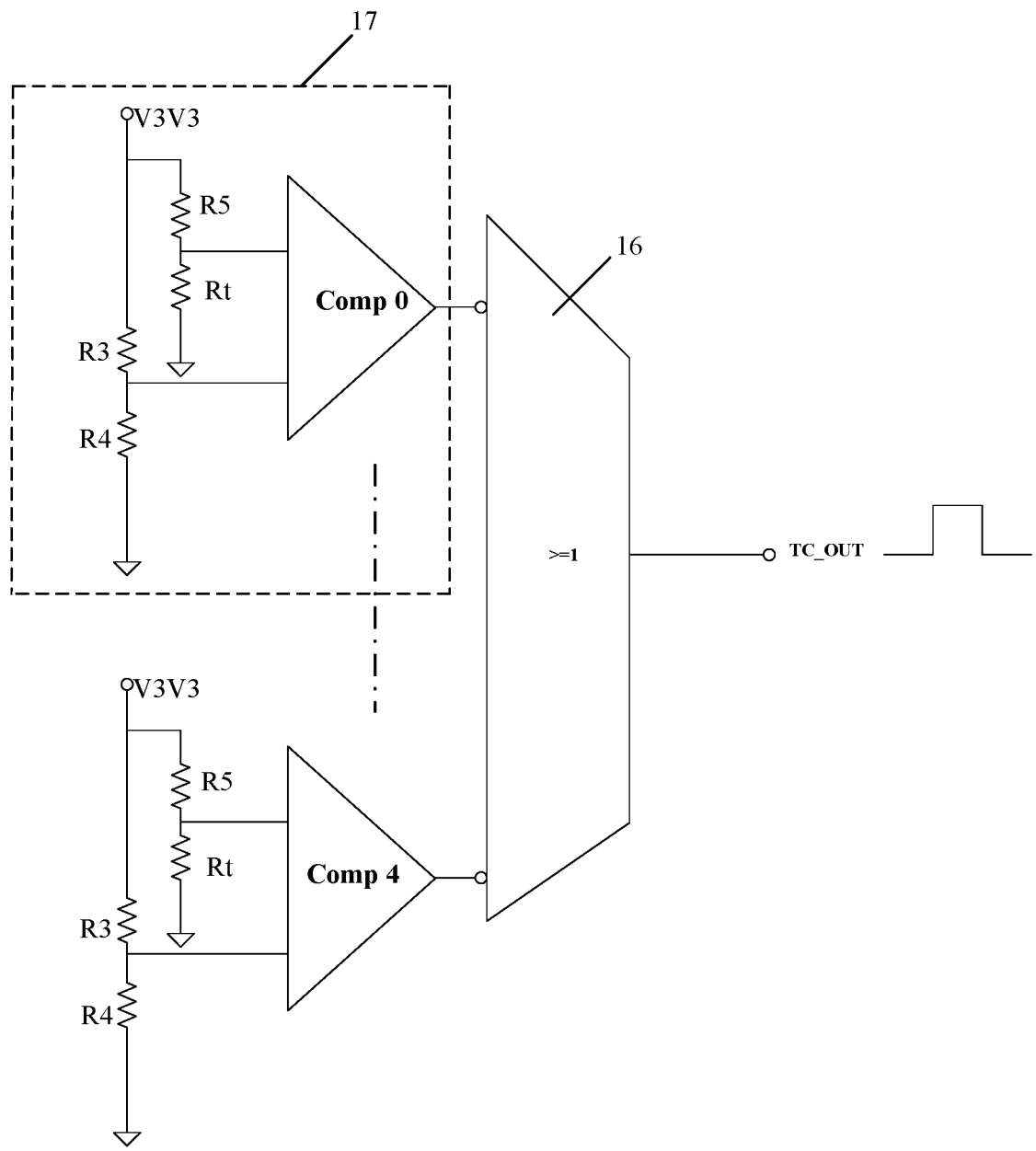
FIG. 4 is a schematic structural diagram of a circuit of a temperature protection module according to an embodiment of the present disclosure.

In another embodiment of the present disclosure, reference is made to FIG. 4, which is a schematic structural diagram of a circuit of a temperature protection module according to an embodiment of the present disclosure.

The temperature protection module includes: an OR gate unit 16 and multiple temperature protection units 17. Output terminals of the temperature protection units 17 are connected to an input terminal of the OR gate unit 16. An output terminal of the OR gate unit 16 serves as an output terminal of the temperature protection module.

Each of the temperature protection units 17 includes: a third resistor R3, a fourth resistor R4, a fifth resistor R5, a thermistor Rt, and a comparator Comp.

A first terminal of the third resistor is connected to a first terminal of the fifth resistor at a connection node, and the connection node is connected to the low-voltage output terminal of the power conversion module.

A second terminal of the third resistor is connected to a first terminal of the fourth resistor at a connection node, and the connection node is connected to a first input terminal of the comparator.

A second terminal of the fifth resistor is connected to a first terminal of the thermistor at a connection node, and the connection node is connected to a second input terminal of the comparator.

A second terminal of the fourth resistor and a second terminal of the thermistor are respectively grounded.

An output terminal of the comparator serves as an output terminal of the temperature protection unit.

In the embodiments of the present disclosure, the thermistor is arranged close to the power MOS transistor in the equalization switch matrix circuit module, performing high-temperature protection for the power MOS transistor, reducing high-temperature damage, extending the service life of the power MOS transistor, and thereby improving the service life and stability of the ASIC chip for performing active battery equalization.

As shown in FIG. 4, TC_OUT represents an output signal of the temperature protection module passing through the OR gate unit. In normal cases, TC_OUT is a low level. After temperature protection is performed on an equalization channel, TC_OUT changes to a high level.

From the above description, it can be seen that in the ASIC chip for performing active battery equalization according to the embodiments of the present disclosure, the driving power supply of the equalization switch matrix circuit module, including power MOS transistors and controlling the active equalization channels, includes an internal grounding terminal and a boost circuit unit. With the internal grounding terminal, it can be ensured that in a case of connecting multiple ASIC chips for performing active battery equalization in series, the multiple ASIC chips for performing active battery equalization do not affect each other. With the boost circuit unit, it can be ensured that the power MOS transistors are quickly turned on with a sufficient driving level and a small internal resistance of the equalization channel is maintained, thereby reducing the self-heating of the power MOS transistors when being turned on.

The equalization switch matrix circuit module, that includes power MOS transistors and controls the equalization channels, adopts a dual switch control mode in which a battery corresponds to an independent power MOS transistor and odd channels and even channels respectively correspond to a pair of power MOS transistors, it is ensured that turning on and turning off are performed based on dual channels, greatly reducing the situations of burning power MOS transistors due to short circuits between battery packs caused by incorrect turning on. In addition, timer equalization timeout protection and hardware over temperature protection are integrated in the equalization switch matrix circuit module, performing both soft protection and hard protection, enhancing the security guarantee of active equalization during use.

Furthermore, with the built-in magnetic isolation SPI communication, analog and digital isolation are performed, safely and conveniently implementing a series connection system without constructing a communication isolation system at a system application level.

That is, with the technology of the ASIC chip for performing active battery equalization according to the embodiments of the present disclosure, an active equalization ASIC design based on high-power switching power MOS transistor array is realized, and internal grounding terminals and magnetic isolation SPI communication are designed based on actual usage scenarios. The ASIC chip for performing active battery equalization according to the embodiments of the present disclosure may be applied to lithium battery pack systems including different numbers of batteries connected in series and having different capacities. Due to that the power MOS transistor switch array that occupy the area of the PCB circuit board and the control circuit are integrated in the ASIC, the difficulty of the BMS manufacturers in integrating high-power active equalization is greatly reduced, facilitating the BMS manufacturers performing active equalization function on lithium batteries, effectively protecting lithium batteries, extending the service life of lithium batteries, and increasing product competitiveness. The user may customize an equalization current according to requirements as long as the equalization current does not exceed a maximum withstand current limit of the power MOS transistors.

The ASIC chip for performing active battery equalization according to the present disclosure is described in detail above. In this specification, specific embodiments are provided for explaining the principles and implementations of the present disclosure. The explanations of the above embodiments are only provided to help understand the methods and core ideas of the present disclosure. For those skilled in the art, modifications in the specific implementations and application scope may be obtained based on the ideas of the present disclosure. In summary, the content of this specification should not be understood as a limitation to the present disclosure.

It should be noted that the embodiments in this specification are described in a progressive way, each of the embodiments emphasizes the differences from others, and the same or similar parts among the embodiments may be referred to each other. Since the device disclosed in the embodiments corresponds to the method disclosed in the embodiments, the description thereof is relatively simple, and relevant parts may refer to the descriptions of the method.

It should be further noted that in this specification, the relational terms, such as "first" and "second", are only used to distinguish one entity or operation from another entity or operation, and do not necessarily require or imply any actual relationship or order between these entities or operations. In addition, the terms of "include", "comprise" or any other variants are intended to be non-exclusive. Therefore, a process, method, article or device including a series of elements includes not only the elements but also other elements inherent for the process, method, article or device. Unless expressively limited otherwise, the statement "comprising (including) one . . . " does not exclude the case that other similar elements may exist in the process, method, article or device other than enumerated elements.

Based on the above description of the disclosed embodiments, those skilled in the art can implement or practice the present disclosure. Various modifications to the embodiments are apparent to those skilled in the art. The general principles defined in the present disclosure may be implemented in other embodiments without departing from the spirit or scope of the present disclosure. Therefore, the present disclosure is not limited to the embodiments described herein, and conforms to the widest scope consistent with the principle and novel features disclosed herein.

The invention claimed is:

1. An application specific integrated circuit (ASIC) chip for performing active battery equalization, comprising: a power conversion module, an equalization switch matrix circuit module, a switch control module, a temperature protection module, and a communication interface module; wherein the equalization switch matrix circuit module comprises a power MOS transistor, a first terminal of the equalization switch matrix circuit module is connected to an input terminal of a battery pack, a second terminal of the equalization switch matrix circuit module is connected to an active equalization power supply, a third terminal of the equalization switch matrix circuit module is connected to the temperature protection module, a fourth terminal of the equalization switch matrix circuit module is connected to the switch control module, the battery pack comprises n batteries connected in series, wherein n>1 and n is a positive integer;

a positive pole of an n-th battery in the battery pack is connected to an input terminal of the power conversion module, a high-voltage output terminal of the power conversion module is connected to the equalization switch matrix circuit module and the switch control module, and a low-voltage output terminal of the power conversion module is connected to the temperature protection module and the communication interface module;

the equalization switch matrix circuit module is configured to perform equalization on a battery in the battery pack, the switch control module is configured to control a switching state of the power MOS transistor in the equalization switch matrix circuit module, the temperature protection module is configured to perform temperature protection on the power MOS transistor in the equalization switch matrix circuit module, and the communication interface module is configured to perform communication with an external system;

the switch control module comprises: a signal output unit, a signal interface unit, and a plurality of control units;

an output terminal of the signal output unit is connected to an input terminal of the signal interface unit, an output terminal of the signal interface unit is connected to an input terminal of the control units, an output terminal of a control unit corresponds to an output terminal of the signal interface unit, and an output terminal of the control unit is connected to a gate of the power MOS transistor in the equalization switch matrix circuit module;

a first input terminal of the signal output unit is connected to the communication interface module, and a second input terminal of the signal output unit is connected to the temperature protection module;

the signal output unit is configured to output a first control signal for controlling operation states of the control units, and the control units are configured to output a second control signal for controlling an operation state of the power MOS transistor in the equalization switch matrix circuit module based on the first control signal;

the power conversion module comprises a boost circuit unit and a buck circuit unit;

an input terminal of the boost circuit unit is connected to an input terminal of the buck circuit unit, and serves as the input terminal of the power conversion module;

an output terminal of the boost circuit unit serves as the high-voltage output terminal of the power conversion module; and an output terminal of the buck circuit unit serves as the low-voltage output terminal of the power conversion module.

2. The ASIC chip for performing active battery equalization according to claim 1, wherein a negative electrode of a first battery serves as an internal grounding terminal of the ASIC chip for performing active battery equalization.

3. The ASIC chip for performing active battery equalization according to claim 1, wherein the equalization switch matrix circuit module comprises: a first main circuit, a second main circuit, n+1 branch circuits, and a current source;

for each of the batteries in the battery pack, a positive pole of the battery is connected to a first terminal of a branch circuit, and a negative pole of a first battery is connected to a first terminal of a branch circuit;

a power MOS transistor is connected in series in the first main circuit, a power MOS transistor is connected in series in the second main circuit, and two power MOS transistors are connected in series in each of the branch circuits;

a first terminal of the first main circuit is connected to a first terminal of the current source and a first terminal of the active equalization power supply;

a first terminal of the second main circuit is connected to a second terminal of the current source and a second terminal of the active equalization power supply;

all second terminals of branch circuits corresponding to odd number-th batteries are connected to a second terminal of the first main circuit; and a second terminal of the branch circuit corresponding to the negative pole of the first battery and second terminals of branch circuits corresponding to even number-th batteries are connected to a second terminal of the second main circuit.

4. The ASIC chip for performing active battery equalization according to claim 1, wherein the power MOS transistor in the equalization switch matrix circuit module is an N-type power MOS transistor.

5. The ASIC chip for performing active battery equalization according to claim 1, wherein the switch control module further comprises a timer protection unit;

a third input terminal of the signal output unit is connected to the timer protection unit; and the timer protection unit is configured to control an operation state of the signal output unit based on a time instant at which performing equalization on the battery and/or a time period of the ASIC chip for performing active battery equalization from overheating to recovery.

6. The ASIC chip for performing active battery equalization according to claim 1, wherein for each of the control units, the control unit comprises a first resistor, a second resistor, a diode, a first MOS transistor, and a second MOS transistor;

a first terminal of the first resistor is connected to a gate of the first MOS transistor at a connection node, and the connection node is connected to the output terminal of the signal interface unit;

a second terminal of the first resistor is connected to a first terminal of a first signal interface unit at a connection node, and the connection node is grounded;

a second terminal of the first MOS transistor is connected to a first terminal of the second resistor, an anode of the diode and a gate of the second MOS transistor;

a second terminal of the second resistor, a cathode of the diode and a first terminal of the second MOS transistor are connected to the high-voltage output terminal of the power conversion module; and a second terminal of the second MOS transistor is connected to the gate of the power MOS transistor in the equalization switch matrix circuit module.

7. The ASIC chip for performing active battery equalization according to claim 6, wherein the first MOS transistor is an N-type power MOS transistor, and the second MOS transistor is a P-type power MOS transistor.

8. The ASIC chip for performing active battery equalization according to claim 1, wherein the temperature protection module comprises: an OR gate unit and a plurality of temperature protection units;

output terminals of the temperature protection units are connected to an input terminal of the OR gate unit, and an output terminal of the OR gate unit serves as an output terminal of the temperature protection module; and for each of the temperature protection units, the temperature protection unit comprises: a third resistor, a fourth resistor, a fifth resistor, a thermistor, and a comparator;

a first terminal of the third resistor is connected to a first terminal of the fifth resistor at a connection node, and the connection node is connected to the low-voltage output terminal of the power conversion module;

a second terminal of the third resistor is connected to a first terminal of the fourth resistor at a connection node, and the connection node is connected to a first input terminal of the comparator;

a second terminal of the fifth resistor is connected to a first terminal of the thermistor at a connection node, and the connection node is connected to a second input terminal of the comparator;

a second terminal of the fourth resistor and a second terminal of the thermistor are respectively grounded; and an output terminal of the comparator serves as an output terminal of the temperature protection unit.

* * * * *